(12) United States Patent
Akama et al.

(10) Patent No.: US 9,579,740 B2
(45) Date of Patent: Feb. 28, 2017

(54) THERMAL PROCESSING APPARATUS

(71) Applicant: ORIGIN ELECTRIC COMPANY, LIMITED, Toshima-ku, Tokyo (JP)

(72) Inventors: Hiroshi Akama, Tokyo (JP); Yutaka Matsumoto, Tokyo (JP); Masami Kuroda, Tokyo (JP); Hironobu Nishimura, Tokyo (JP)

(73) Assignee: Origin Electric Company, Limited, Saitama-shi, Saitama (JP)

( * ) Notice: Subject to any disclaimer, the term of this patent is extended or adjusted under 35 U.S.C. 154(b) by 135 days.

(21) Appl. No.: 14/430,526

(22) PCT Filed: Sep. 6, 2013

(86) PCT No.: PCT/JP2013/074093
§ 371 (c)(1),
(2) Date: Mar. 23, 2015

(87) PCT Pub. No.: WO2014/050508
PCT Pub. Date: Apr. 3, 2014

(65) Prior Publication Data
US 2015/0246405 A1    Sep. 3, 2015

(30) Foreign Application Priority Data

Sep. 27, 2012 (JP) ................. 2012-213435

(51) Int. Cl.
*A21B 2/00*    (2006.01)
*F26B 3/30*    (2006.01)
(Continued)

(52) U.S. Cl.
CPC ............... *B23K 3/04* (2013.01); *B23K 1/005* (2013.01); *B23K 1/008* (2013.01); *B23K 1/0016* (2013.01); *H05B 3/0047* (2013.01); *H05B 3/44* (2013.01)

(58) Field of Classification Search
None
See application file for complete search history.

(56) References Cited

U.S. PATENT DOCUMENTS 4,438,356 A * 3/1984 Fleischer ............. H03K 17/691
327/409
6,051,823 A * 4/2000 Sandhu ............. C23C 16/45565
219/390

(Continued)

FOREIGN PATENT DOCUMENTS

JP    10-321530    12/1998
JP    2005-101228    4/2005
(Continued)

OTHER PUBLICATIONS

International Search Report for PCT/JP2013/074093, mailed Nov. 19, 2013, 2 pgs.
(Continued)

Primary Examiner — Thor Campbell
(74) Attorney, Agent, or Firm — Squire Patton Boggs (US) LLP

(57) ABSTRACT

To provide a thermal processing apparatus where a projection area perpendicular to the axis of a sealing structure and attachment structure of heat radiation heater is decreased and a chamber volume is decreased. The apparatus has a chamber for accommodating a workpiece of a thermal processing object, the chamber having a partition wall for partitioning inside from outside of the chamber, a heat radiation heater disposed penetrating the partition wall, wherein the heater has a ring seal arranged on an outer peripheral surface of the extension section, and hermetically sealing the chamber, and a heat blocking plate arranged between the heat radiation unit and the ring seal in the axial direction of the glass tube, for blocking heat radiated from (Continued)

the heat radiation unit to the ring seal, the heat blocking plate having an inner peripheral surface fitting along the extension section.

9 Claims, 6 Drawing Sheets

(51) Int. Cl.
  *B23K 3/04* (2006.01)
  *B23K 1/008* (2006.01)
  *H05B 3/44* (2006.01)
  *B23K 1/00* (2006.01)
  *B23K 1/005* (2006.01)
  *H05B 3/00* (2006.01)

(56) References Cited

U.S. PATENT DOCUMENTS

2003/0029859 A1* 2/2003 Knoot ............... H01L 21/67248
            219/483
2008/0019679 A1* 1/2008 Kubo ................ H01L 21/67115
            392/416
2013/0234049 A1* 9/2013 Linow ..................... H01K 1/38
            250/492.1

FOREIGN PATENT DOCUMENTS

| JP | 2008-028305 | 2/2008 |
| JP | 2009-088105 | 4/2009 |
| JP | 2010-118217 | 5/2010 |
| JP | 2011-190511 | 9/2011 |
| WO | WO 81/03536 | 12/1981 |
| WO | WO 2012/065688 | 5/2012 |

OTHER PUBLICATIONS

Japan Patent Office action for Japanese Application No. 2012-213435, dispatched Sep. 15, 2015, with partial English Translation relevant to cited references, 5 pages total.
Extended European Search Report of European application No. 13841015.4 dated Aug. 3, 2016, 7 pages.

* cited by examiner

THERMAL PROCESSING APPARATUS

TECHNICAL FIELD

The present invention relates to a thermal processing apparatus that performs thermal processing on a workpiece, and particularly relates to a thermal processing apparatus that performs thermal processing by heating a workpiece inside a chamber.

BACKGROUND ART

In the related art, as illustrated in FIG. 6, a heating apparatus 300 is known which has a glass tube 301 penetrating a hermetically sealed chamber 310 surrounding a workpiece 200. In this apparatus, a sealing member 304 seals a portion between the chamber 310 and the glass tube 301, and an infrared reflection film 301a is formed on a surface of the glass tube 301 in a region corresponding to the sealing member 304. Additionally, cooling air 330 is forced to flow and a filament lamp 320 is arranged inside the glass tube 301 (refer to PTL 1, for example, refer to claim 1 and FIG. 2).

PRIOR ART DOCUMENT

Patent Document

[PTL 1] JP-A-2011-190511 (for example, refer to claim 1 and FIG. 2)
[PTL 2] JP-A-2009-88105

DISCLOSURE OF INVENTION

Problem to be Solved by the Invention

However, in the heating apparatus 300 of the related art, a projection area is large in a direction perpendicular to the axis of the glass tube 301 and the sealing member 304, and the volume of the chamber 310 is obliged to be large. Therefore, a longer time is required to adjust the atmosphere inside the chamber 310, and thus the heating apparatus cannot be excellent to be productive. The present invention is made in view of these problems, and an object thereof is to provide a thermal processing (heat treating) apparatus, a volume of a chamber of which is reduced by decreasing a projection area in a direction perpendicular to an axis of an attachment structure and a sealing structure of a heat radiation heater.

Means for Solving the Problem

To achieve the above problem, a thermal processing apparatus of the first aspect of the invention 100 comprises, as shown in FIGS. 1, 2A and 2B for example, a chamber 10 for accommodating a workpiece 200 of a thermal processing object, the chamber 10 having a partition wall 10a for partitioning an inside of the chamber from an outside of the chamber; a heat radiation heater 20 disposed penetrating the partition wall 10a, wherein the heat radiation heater 20 has a heat radiation unit 2 for radiating heat to heat the workpiece 200, and a cylindrical glass tube 1 covering the heat radiation unit 2 and having an extension section 3 extended outward beyond the heat radiation unit 2 in an axial direction; a ring seal 4 arranged on an outer peripheral surface 3a of the extension section 3, and hermetically sealing the inside of the chamber 10 from the outside of the chamber 10, the ring seal 4 having an inner peripheral surface 4a coming into contact with the outer peripheral surface 3a of the extension section 3; and a heat blocking (shielding) plate 5 arranged between the heat radiation unit 2 and the ring seal 4 in the axial direction of the glass tube 1, for blocking (shielding) heat radiated from the heat radiation unit 2 to the ring seal 4, the heat blocking plate 5 having an inner peripheral surface 5d fitting along the extension section 3.

According to this configuration, as compared to the sealing structure of the heat radiation heater in the related art, the heat radiation heater can be with a decreased or small projection area in the direction perpendicular to the axis of the sealing structure (ring seal) of the heat radiation heater which hermetically seals (closes in an airtight manner) the inside of the chamber. Therefore, a productive and excellent thermal processing apparatus can be realized which accommodates the heat radiation heater having the same output in the size-decreased (size-reduced) chamber and which has high atmospheric adjustment efficiency. Additionally, even when multiple heat radiation heaters adjacent to each other are provided, the heat radiation heaters can be arranged more closely. Therefore, an excellent thermal processing apparatus can be realized which has high heating efficiency.

According to aspect (2) of the present invention, as shown in FIGS. 1 and 2B for example, the thermal processing apparatus 100 according to aspect (1), further comprises, a cooling block 30 for holding the heat blocking plate 5, the cooling block 30 covering the extension section 3 and extending outward from the partition wall of the chamber 10 in the axial direction of the glass tube 1, wherein the outer peripheral surface 4b of the ring seal 4 hermetically seals coming into contact with the cooling block 30.

When this configuration is adopted, the heat blocking plate and the ring seal can be efficiently cooled by the cooling block. Therefore, since a separating distance between the heat radiation unit and the ring seal and a separating distance between the heat radiation unit and the heat blocking plate can be small, the sealing structure of the heat radiation heater can be downsized in the axial direction. Therefore, the excellent thermal processing apparatus can be realized in which the downsized chamber is provided.

According to aspect (3) of the present invention, as shown in FIG. 1 for example, the thermal processing apparatus 100 according to aspect (2), further comprises a cooling medium circulation device 40e for cooling the cooling block 30.

When this configuration is adopted, the ring seal and the heat blocking plate can be more efficiently cooled by a cooling medium (for example, water or air) via the cooling block. Accordingly, the separating distance between the heat radiation unit and the ring seal and the separating distance between the heat radiation unit and the heat blocking plate can be further decreased (reduced). Therefore, the sealing structure of the heat radiation heater can be further downsized in the axial direction. Accordingly, the excellent thermal processing apparatus can be realized in which the further downsized chamber is provided.

According to aspect (4) of the present invention, as shown in FIG. 3A for example, the thermal processing apparatus 100 according to aspect 2 or 3, further comprises, a spacer block 40 having a through-hole 40a penetrated therethrough by the cooling block 30, the spacer block 30 being for positioning the heat radiation heater 20 for the workpiece 200 (see FIG. 1) at a predetermined position, wherein the spacer block 40 is attached hermetically covering a through-opening 10b having a larger opening area than the through-hole 40a and the through-opening 10b is formed on the partition wall 10a of the chamber 10, and wherein the cooling block 30 and the spacer block 40 are attached to each other being hermetically sealed.

When this configuration is adopted, the thermal processing apparatus can be disposed so as to efficiently heat the workpiece by arranging the through-hole of the spacer block through which the cooling block covering and supporting the heat radiation heater penetrates, at any optional position suitable for the heat radiation heater to heat the workpiece. Additionally, in contrast, the thermal processing apparatus can be provided so as to hermetically cover the through-opening formed in the partition wall of the chamber with the spacer block. Therefore, without preparing a dedicated chamber for each different arrangement of the heat radiation heaters, the heat radiation heaters can be arranged at any optional position suitable to heat the workpiece. Additionally, the arrangement of the heat radiation heaters could be quickly and easily changed. Therefore, the productive and excellent thermal processing apparatus can be realized which can efficiently perform thermal processing (heat treatment) on more various workpieces.

According to aspect (5) of the present invention, as shown in FIG. 4 for example, the thermal processing apparatus 100 according to aspect (1), further comprises, a spacer block 40 having a through-hole 40$a$ for attaching the heat radiation heater 20, the spacer block 40 being for positioning the heat radiation heater 20 at a predetermined position relative to the workpiece 200 (see FIG. 1), wherein the spacer block 40 is attached hermetically covering a through-opening 10$b$ having a larger opening area than the through-hole 40$a$ and the through-opening 10$b$ is formed on the partition wall 10$a$ of the chamber 10, and wherein the outer peripheral surface 4$b$ (see FIG. 2B) of the ring seal 4 hermetically seals coming into contact with the inner peripheral surface 40$b$ of the through-hole 40$a$.

When this configuration is adopted, even when the cooling block is not provided, similarly to the thermal processing apparatus according to aspect (4), the thermal processing can be efficiently performed on the workpiece by arranging the heat radiation heater in the through-hole disposed at any optional position of the spacer block. Therefore, without preparing a dedicated chamber for each different arrangement of the heat radiation heaters, the heat radiation heaters can be arranged at any optional position suitable to heat the workpiece. Additionally, the arrangement of the heat radiation heaters could be quickly and easily changed. Therefore, the productive and excellent thermal processing apparatus can be realized which can efficiently perform thermal processing on more various workpieces.

According to aspect (6) of the present invention, as shown in FIG. 2A for example, in the thermal processing apparatus 100 according to any one of aspects 1 to 5, the heat blocking plate 5 is formed in a ring shape, and split into multiple components in such a way that the ring is split into multiple sections 5$a$, 5$b$ by a split surface 5$e$ or surfaces in a radial direction.

When this configuration is adopted, even when the heat blocking plate is attached to the heat radiation heater whose end portions are widened by being pressed against and superimposed on each other flatways, the split heat blocking plate can be easily assembled in the direction perpendicular to the axis of the heat radiation heater. In this case, the assembly work is not required to carry out which causes the end portion in the axial direction of the widened glass tube to penetrate the through-hole of the integrally formed heat blocking plate. Additionally, the heat blocking plate is made to be split into the multiple components, and the heat blocking plate split into the multiple components can be respectively assembled by placing the inner peripheral surface along the outer peripheral surface of the extension section of the glass tube. The heat blocking plates split in this way can also prevent a temperature rise in the ring seal by blocking the heat for the ring seal in the axial direction.

According to aspect (7) of the present invention, as shown in FIG. 5 for example, in the thermal processing apparatus 100 according to any one of aspects 2 to 4, the heat blocking plate 5 (see FIG. 1 for example) and the cooling block 30 (see FIG. 1 for example) are formed as an integral component 30$e$.

When disposed in this way, heat transfer is improved by integrally forming the heat blocking plate and the cooling block, thereby enabling to perform more efficient cooling. Accordingly, the separating distance between the heat radiation unit and the ring seal and the separating distance between the heat radiation unit and the heat blocking plate can be further decreased. Therefore, the sealing structure of the heat radiation heater can be further downsized in the axial direction. Accordingly, the excellent thermal processing apparatus can be realized in which the further downsized chamber is provided.

Effect of the Invention

According to the present invention, a thermal processing apparatus, a volume of a chamber of which is decreased can be provided.

BRIEF DESCRIPTION OF DRAWINGS

FIG. 2A is a view when a heat blocking plate is viewed from the inside of the heat radiation heater in an axial direction.

FIG. 2B is an enlarged front cross-sectional view of an adjustment side cooling block.

FIG. 2C is a view when the heat radiation heater is viewed from the outside in the axial direction.

FIG. 3A is a view illustrating a state where the heat radiation heater, a cooling block and a spacer block are assembled to a chamber partition wall.

FIG. 3B is a view illustrating a through-opening of the chamber partition wall in a state where the heat radiation heater, the cooling block and the spacer block are removed from the chamber partition wall.

This application is based on the Patent Application No. 2012-213435 filed on Sep. 27, 2012 in Japan, the contents of which are hereby incorporated in its entirety by reference into the present application, as part thereof.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

BEST MODE FOR CARRYING OUT THE INVENTION

Embodiments of the present invention will be described hereinafter in detail with reference to the drawings. In each drawing, like numerals and symbols will be used for identical or like elements, and duplicate descriptions will not be repeated. The present invention is not limited to the embodiments described below.

Figure 1:
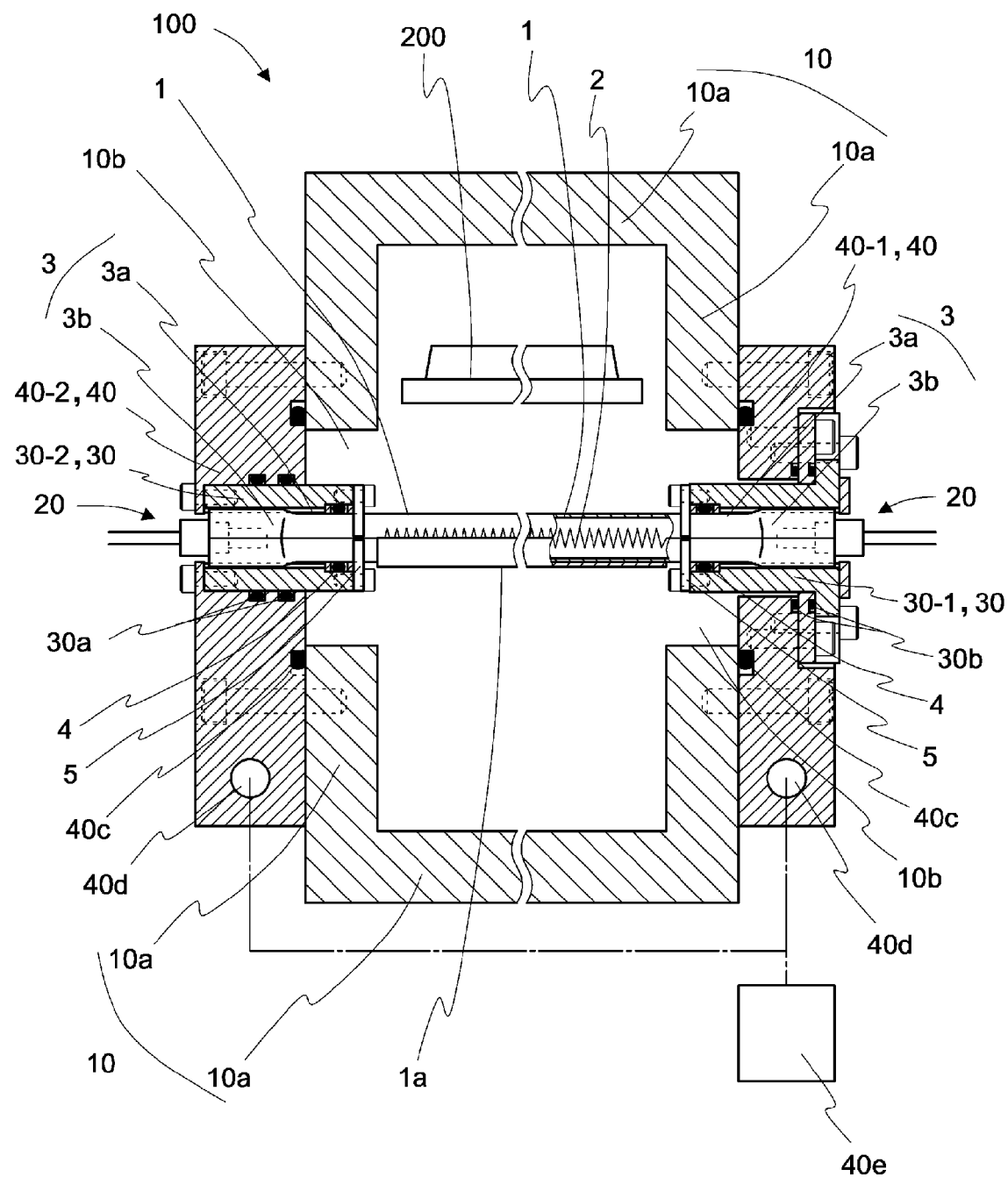
FIG. 1 is a front cross-sectional view illustrating an example of a thermal processing apparatus according to a first embodiment of the present invention. The drawing illustrates the thermal processing apparatus in the example and a workpiece the intermediate sections in a longitudinal direction of which are cut away by two wavy lines so as to be partially omitted in the drawing. Additionally, a glass tube of a heat radiation heater and a white ceramic paint are illustrated by being partially cut away.

Referring to FIG. 1, a soldering apparatus 100 will be described as a thermal processing apparatus according to a first embodiment of the present invention. The soldering apparatus 100 according to the present embodiment which is illustrated in FIG. 1 is provided as an apparatus for very reliably soldering a circuit board 200 as a workpiece by replacing the atmosphere inside a chamber 10 with a reducing gas atmosphere. The circuit board 200 is configured to include a board and electronic components, and the electronic components are arranged on the board. The electronic components or the electronic component and a lead wire are soldered with each other. Hereinafter, in some cases, this soldering is simply referred to as "the circuit board 200 is soldered". When the circuit board 200 is soldered in the reducing gas atmosphere, an oxide film can be prevented from being formed on a soldering joint surface, and the soldering can be very reliably performed through reduction removal of the formed oxide film.

In the present embodiment, the oxide film on the soldering joint surface can be removed without adding flux (reducing agent) which may inhibit the soldering depending on conditions to solder. When the flux is not added to the solder, the soldering can be more reliably performed. Additionally, when the flux is not added to the solder, a flux cleaning step of removing the flux by cleaning the circuit board 200 after the soldering is not required. Accordingly, efficient and productive soldering can be performed.

In the soldering apparatus 100 according to the present embodiment, air inside the sealed chamber 10 is first sucked and exhausted by using a vacuum pump (not illustrated) so as to obtain lower pressure than the atmospheric pressure (for example, approximately 50 mTorr to 1000 mTorr). Subsequently, hydrogen gas serving as reducing gas is injected into the chamber 10 so as to adjust the atmosphere inside the chamber 10. Thereafter, the circuit board 200 is heated and soldered inside the chamber 10 in which the atmosphere is adjusted.

The soldering apparatus 100 includes a halogen heater 20 serving as a heat radiation heater which heats the circuit board 200 by means of heat radiation. In the soldering apparatus 100 according to the present embodiment, a plurality of halogen heaters (heat radiation heaters) 20 are arranged side by side in parallel with each other on the same plane (refer to FIG. 3A). This arrangement can downsize a sealing structure for sealing the halogen heater 20 (to be described in detail later), thereby allowing a significant advantageous effect to be accumulated. In this manner, the chamber 10 of the soldering apparatus 100 can be considerably downsized.

The halogen heater 20 is disposed by covering a tungsten-made heat radiation coil 2 serving as a heat radiation member with a cylindrical glass tube 1 made of quartz glass. The glass tube 1 is sealed after being filled with inert gas (for example, nitrogen, argon, or the like) and halogen gas (for example, iodine, bromine, or the like). The halogen heater 20 can be quickly heated and cooled by a halogen cycle between the halogen and the tungsten. Thus, the temperature of the heat radiation coil 2 can be as high as over 2700° C. within a few seconds after being energized. Therefore, the halogen heater 20 can quickly heat the opposing circuit board 200 by using the heat radiation transferred from the heat radiation coil 2 whose temperature has become high. Additionally, the halogen heater 20 can maintain a sufficiently long life of the tungsten coil thanks to the halogen cycle. Therefore, the excellent heat radiation heater can be realized which can quickly heat the circuit board serving as the workpiece and which is very economically productive.

The halogen heater 20 can heat the circuit board 200 facing the halogen heater 20 by using the heat radiation (including infrared radiation in a wide wavelength region from a near infrared wavelength region (approximately 0.75 μm to 4 μm) to a far infrared wavelength region (approximately 4 μm to 1 mm)). The halogen heater 20 is disposed at a fixed position away from the circuit board 200, but can directly heat the circuit board 200 from the position. For example, the halogen heater 20 heats a soldering joint up to 220° C. to 400° C. In this manner, the halogen heater 20 can solder the circuit board 200 by heating the soldering joint up to the melting point of the solder or higher. For example, in a case of the soldering joint where the solder containing much lead as one of the components is to be used, the heating temperature for the soldering joint can be adjusted to 300° C.

The halogen heater 20 is disposed in a linear shape (rod shape) as illustrated. Distribution (heat radiation amount) of heat radiation from the halogen heater 20 can be realized as desired heat radiation distribution, for example, by changing distribution sparseness and denseness of the tungsten coil (heat radiation unit) 2. In the present embodiment, the halogen heater 20 is disposed by changing the number of windings of the coil so that the density of the coil is low (sparse) (not illustrated) in the central portion of the halogen heater 20 whose temperature is likely to become high and the density of the coil is high (dense) in both end portions. When disposed in this way, the halogen heater 20 can, for example, uniformly heat the overall circuit board 200, by changing the heat radiation distribution (heat radiation amount) depending on the mass (heat capacity) of the soldering joint, the surface area, and the required quality for soldering (for example, a degree of reliability). On the other hand, the halogen heater 20 can also be configured so that the distribution of heat radiation (heat radiation amount) from the halogen heater 20 is the heat radiation distribution (heat radiation amount) by which only the soldering joint at any optional portion of the circuit board 200 is intensively heated.

In the present embodiment, the circuit board 200 is arranged above the halogen heater 20 as illustrated. The halogen heater 20 is disposed so as to heat the circuit board 200 from below. The circuit board 200 may be arranged inside the chamber 10 by being placed on a support base for supporting the circuit board. The support base is made of a material having heat resistance and heat conductivity. When the circuit board 200 is heated by the heat radiation via the support base, the heat radiation from the halogen heater 20 can be uniformed by the support base, thereby enabling the circuit board 200 to be evenly and uniformly heated. Additionally, the outer surface of the half peripheral surface of the glass tube 1 which is not opposed to the circuit board 200, that is, a part of the surface of the glass tube 1 surrounding the tungsten coil 2 of the halogen heater 20, has a white ceramic paint 1a applied thereto in order to reflect the heat radiation radiated in a direction which is not opposed to the circuit board 200 toward the circuit board 200. In this manner, a portion of the halogen heater 20 which is not opposed to the circuit board 200 to be soldered is disposed as a reflection surface 1a. Accordingly, the heat radiation radiated toward the circuit board 200 to be soldered can be further increased. In this case, the circuit board 200 can be more efficiently heated.

The cylindrical glass tube 1 surrounding the tungsten coil 2 serving as the heat radiation unit of the halogen heater 20 has an extension section 3 which is extended outward beyond the tungsten coil 2 in the axial direction. A tungsten wire is disposed in a linear shape inside the extension section 3. The reason is that the large amount of radiation due to resistance heating in the tungsten wire wound in a coil shape is prevented. In this manner, the tungsten wire inside the extension section 3 can be disposed so as to be different from the tungsten coil 2, and can be disposed so that the extension section 3 has significantly decreased heat radiation from the conducting wire (tungsten wire) as compared to the heat radiation from the tungsten coil 2. Therefore, in the extension section 3, the temperature of an outer peripheral surface 3a of the glass tube 1 can be lower than the temperature of the outer peripheral surface of the glass tube 1 surrounding the tungsten coil 2.

The extension section 3 is disposed to extend from the tungsten coil 2 in the axial direction. Therefore, as the extension section 3 is extended outward beyond the tungsten coil 2 in the axial direction, the extension section 3 is separated or getting more away from the part of glass tube 1 surrounding the tungsten coil 2. Therefore, the extension section 3 is less likely to receive heat transfer from the part of glass tube 1 surrounding the tungsten coil 2. Additionally, as the extension section 3 is extended outward beyond the tungsten coil 2 in the axial direction, the extension section 3 is no longer opposed to or no longer faces (is offset by) the tungsten coil 2, and thus is less likely to receive the heat radiation from the tungsten coil. Therefore, in the extension section 3, the heat radiation and the heat transfer are less likely to raise the temperature.

Additionally, the halogen heater 20 is disposed penetrating a partition wall 10a which partitions the inside of the chamber 10 from the outside of the chamber 10. In this case, both end portions of the halogen heater 20 penetrate the partition wall 10a of the chamber. In other words, the outside beyond an O-ring 4 serving as a ring seal of the extension section 3 of the glass tube 1 (to be described in detail later) is located on the atmosphere side, and thus both end portions of the halogen heater 20 are extended outward beyond the chamber 10 which is open to the atmosphere. Therefore, heat spreads to the atmosphere from both end portions of the halogen heater 20 which is open to the atmosphere. Accordingly, the temperature of the outer peripheral surface 3a of the extension section 3 can be further lowered. Additionally, when disposed in this way, an electrode and a terminal which are located at both end portions of the halogen heater 20 can be disposed outside the chamber 10. Therefore, the electrode and the terminal of the halogen heater 20 can be prevented from being exhausted due to repeated heating and pressure reducing. Additionally, since both end portions of the halogen heater 20 are not accommodated inside the chamber 10, the chamber 10 can be downsized in the axial direction of the halogen heater 20.

The extension section 3 of the glass tube 1 has the O-ring 4 arranged as the ring seal which hermetically seals (sealing) the inside of the chamber 10 from the outside of the chamber 10 in such a way that an inner peripheral surface 4a (refer to FIG. 2B) comes into contact with the outer peripheral surface 3a of the extension section 3. The O-ring 4 has a circular cross section and a planar shape, and is made of an elastic material having heat resistance (for example, Viton (registered trademark) which is fluorine rubber). The inner peripheral surface 4a of the O-ring 4 is disposed so as to hermetically seal the halogen heater 20 penetrating the partition wall 10a of the chamber by directly coming into contact with the outer peripheral surface 3a of the glass tube 1 of the halogen heater 20. Accordingly, the O-ring 4 can be formed with a decreased diameter of an outer periphery 4b (refer to FIG. 2B). Therefore, the halogen heater 20 can be disposed with a decreased projection area in a direction perpendicular to the axis of sealing structure.

A heat blocking plate 5 is disposed at a position in the axial direction of the halogen heater 20 between the tungsten coil 2 and the O-ring 4. The heat blocking plate 5 is for blocking or shielding the heat radiation radiated in the axial direction of the halogen heater 20 from the tungsten coil 2 toward the O-ring 4 so as to prevent the temperature of the O-ring 4 from being raised. An inner peripheral surface 5d (refer to FIG. 2A) of the heat blocking plate 5 is formed along the outer peripheral surface 3a of the extension section 3 of the glass tube 1. Accordingly, the heat radiation in the axial direction of the halogen heater 20 can be effectively blocked. Therefore, the O-ring 4 can be arranged to be close to the tungsten coil 2 in the axial direction of the halogen heater 20. Accordingly, the soldering apparatus 100 according to the present embodiment can be formed with a decreased internal volume of the chamber 10.

As in the present embodiment, it is preferable to dispose the heat blocking plate 5 so that the heat is not directly transferred from the heat blocking plate 5 to the O-ring 4 by arranging the heat blocking plate 5 to be separated from the O-ring 4. Additionally, it is preferable to dispose the heat blocking plate 5 and the O-ring 4 so that the heat is less likely to be transferred by arranging the heat blocking plate 5 and the O-ring 4 with other component(s) for hindering the heat transfer (alternatively, multiple discontinuous surfaces (heat transfer surfaces) for reducing heat conductivity) therebetween. However, as will be described in detail later, when the heat blocking using heat reflection by the heat blocking plate 5 or the heat blocking using heat absorption and cooling functions sufficiently, the heat blocking plate 5 and the O-ring 4 may be disposed by bringing both of these into direct contact with each other.

The heat blocking plate 5 is made of stainless steel which is excellent in heat resistance and relatively good in insulation. When the heat blocking plate 5 is made of the stainless steel which is good in insulation, the O-ring 4 can be suitably blocked from the heat. Additionally, it is preferable to perform surface treatment at least on a reflection surface 5c (refer to FIG. 2A) of the heat blocking plate 5 which faces the halogen heater 20 in the axial direction, with a material having higher reflectivity than the stainless steel as a base material. Typically, nickel plating or chromium plating can be performed on the surface of the stainless steel. In this way, the reflectivity of the reflection surface 5c can be improved. In this manner, the O-ring 4 can be blocked and protected from the heat in the axial direction of the halogen heater 20 by reflecting the heat radiation in the axial direction from the tungsten coil 2.

As described above, the O-ring 4 is blocked from the heat radiated from the tungsten coil 2 by being arranged based on a positional relationship (by being separated and offset) in the extension section 3 of the glass tube 1. Furthermore, the heat blocking plate 5 blocks the heat radiation radiated from the tungsten coil 2 in the axial direction of the halogen heater 20, thereby enabling the O-ring 4 to be more effectively blocked from the heat. In the soldering apparatus 100 according to the present embodiment, the present inventor has confirmed that the temperature of the outer peripheral surface 3a of the extension section 3 of the glass tube 1 for arranging the O-ring 4 therein can be approximately 150° C. or lower. Therefore, even when the O-ring 4 is directly disposed on the outer peripheral surface 3a of the extension section 3 of the glass tube 1, the halogen heater 20 can be disposed with the sealing structure downsized in the direction-perpendicular to the axis of the heater, without causing the O-ring 4 to suffer from thermal breakdown. Therefore, the soldering apparatus 100 which accommodates the same halogen heater 20 can be disposed with the decreased internal volume of the chamber 10. Accordingly, the productive and excellent soldering apparatus can be realized which has high atmospheric adjustment efficiency.

Figure 6:
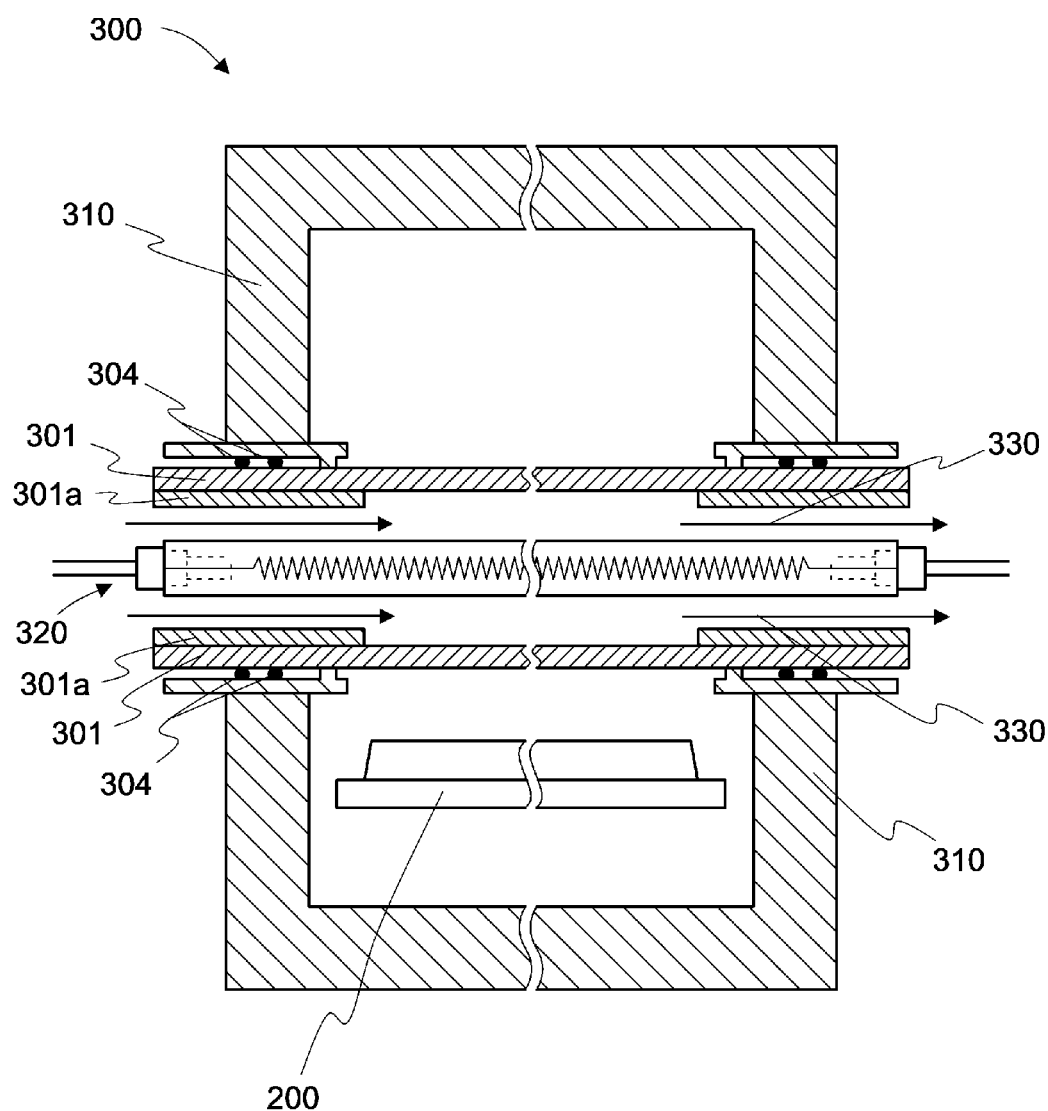
FIG. 6 is a front cross-sectional view illustrating a heating apparatus in the related art. The drawing illustrates the heating apparatus in the related art and the intermediate section of the workpiece in the longitudinal direction which are cut away by two wavy lines so as to be partially omitted in the drawing.

As described above, various methods have also been attempted by which the heating apparatus 300 (refer to FIG. 6) in the related art is disposed with an internal volume of the chamber 310 (refer to FIG. 6) made as small as possible. However, it was difficult to downsize the sealing structure for hermetical sealing. The reason is that the sealing structure is caused to suffer thermal breakdown if the downsizing is forcibly made. Additionally, the fact that the sealing structure of the filament lamp 320 cannot be downsized is a major reason why the internal volume of the chamber 310 of the heating apparatus 300 cannot be downsized. The soldering apparatus 100 serving as the thermal processing apparatus according to the present invention solves this problem. The multiple halogen heaters 20 can be arranged more closely by arranging the multiple halogen heaters 20 so as to be adjacent to each other as in the soldering apparatus 100 according to the present embodiment (for example, refer to FIG. 3A). Therefore, the productive and excellent soldering apparatus can be realized which has high heating efficiency (heating density) for the circuit board 200.

Furthermore, the soldering apparatus 100 according to the present embodiment includes the cooling block 30 which holds the heat blocking plate 5, covers the extension section 3 of the glass tube 1, and extends outward from the partition wall 10a of the chamber in the axial direction of the glass tube 1. The cooling block 30 has large heat capacity (mass), and extends outward from the chamber partition wall 10a. The O-ring 4 is disposed so that the outer peripheral surface 4b (refer to FIG. 2B) comes into contact with the cooling block 30 for hermetical sealing. Therefore, the cooling block 30 can suitably cool the O-ring 4. Similarly, the heat blocking plate 5 is directly fixed to the cooling block 30 by means of screw fastening. Therefore, the cooling block 30 can cool the heat blocking plate 5 and the O-ring 4 at the same time. Additionally, the cooling block 30 is made of stainless steel which is good in insulation. Therefore, the heat radiation (heat reflection) from the inside of the chamber 10 can be blocked through various reflection routes, and the heat can be more suitably blocked for the extension section 3 and the O-ring 4 of the glass tube 1 covered with the cooling block 30.

In this manner, the cooling block 30 cools the heat blocking plate 5 and the O-ring 4, thereby enabling the heat blocking plate 5 and the O-ring 4 to be arranged to be closer to the tungsten coil 2 in the axial direction of the halogen heater 20. Accordingly, the sealing structure of the halogen heater can be downsized in the axial direction. Therefore, the productive and excellent soldering apparatus 100 can be realized in which the internal volume of the chamber 10 is further decreased and which has high atmospheric adjustment efficiency.

The cooling block 30 is disposed so as to be forcibly cooled by using a cooling medium circulation device 40e for circulating cooling water serving as a cooling medium which cools the cooling block 30. The cooling block 30 is assembled into a through-hole 40a (refer to FIG. 3A) formed in a spacer block 40 (to be described in detail later), and is attached to an inner diameter 40b of the through-hole 40a by being hermetically sealed using hermetical seals 30a and 30b. Therefore, the cooling medium circulation device 40e circulates the cooling water inside a cooling medium flow path 40d formed in the spacer block 40, thereby enabling the cooling block 30 to be cooled forcibly.

In a case where the cooling block 30 is forcibly cooled, as compared to a case where the cooling block 30 is naturally cooled, cooling or heat blocking for the heat blocking plate 5 and the O-ring 4 can be performed more efficiently. Therefore, the heat blocking plate 5 and the O-ring 4 can be arranged to be closer to the tungsten coil 2 in the axial direction of the halogen heater 20. Accordingly, the sealing structure of the halogen heater can be further downsized in the axial direction. Therefore, the productive and excellent soldering apparatus 100 can be realized in which the internal volume of the chamber 10 is further decreased and which has high atmospheric adjustment efficiency.

Figure 2A:
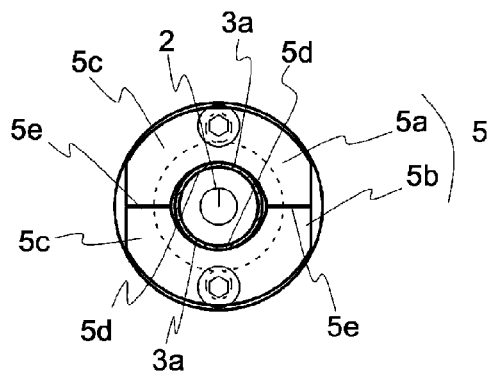
FIGS. 2A to 2C are enlarged explanatory views illustrating an example of the thermal processing apparatus according to the first embodiment of the present invention.
Figure 2B:
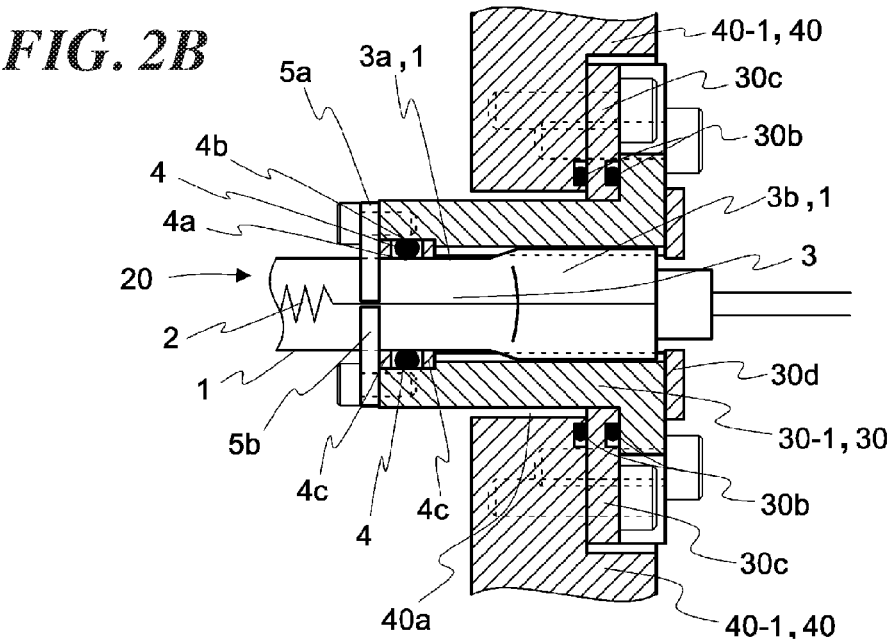
Figure 2C:
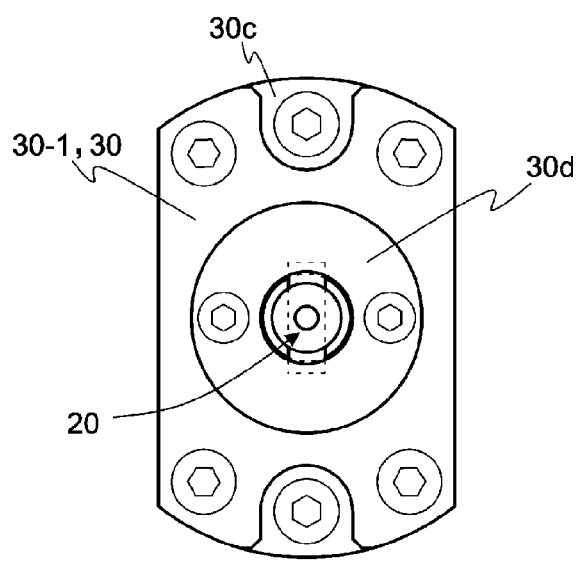

Referring to FIGS. 2A to 2C, the soldering apparatus 100 serving as the thermal processing apparatus according to the present embodiment will be described in detail. FIG. 2A illustrates the heat blocking plate 5 when viewed from the inside (inside of the chamber 10) in the axial direction of the halogen heater. The heat blocking plate 5 is formed in a ring shape as a whole, but the ring is split into two sections of a first split component 5a and a second split component 5b by a split surface 5e. In the halogen heater 20 according to the present embodiment, halogen gas serving as functional gas is filled inside the glass tube 1. Therefore, end portions in the axial direction of the cylindrical glass tube 1 of the halogen heater 20 are widened by being hot-pressed against and superimposed on each other flatways, thereby forming a flat portion 3*b* (refer to FIG. 2B). The flat portion 3*b* has a width larger than a cylindrical outer diameter of the halogen heater 20. Therefore, by splitting the heat blocking plate 5 into the two components 5*a* and 5*b*, the inner peripheral surface 5*d* of the heat blocking plates 5*a* and 5*b* can be aligned with and assembled to the outer peripheral surface 3*a* of the extension section 3 of the glass tube 1 having the flat portion 3*b*. The heat blocking plates 5*a* and 5*b* which are split in this way can also prevent a temperature rise in the O-ring 4 by blocking the heat for the O-ring 4 in the axial direction. The heat blocking plate 5 can be typically split into two sections, but may be split into three sections, four sections, or any other optional number of sections.

The glass tube 1 cannot always be produced so as to have a constant thickness (diameter). Since the O-ring 4 is elastic, a serious problem does not occur. However, in a case of the heat blocking plate 5 formed of a metal plate, variations in the thickness (diameter) of the glass tube 1 can cause a problem. In order to align the inner peripheral surface 5*d* of the heat blocking plate 5 with the outer peripheral surface 3*a* of the glass tube 1, as illustrated, the inner peripheral diameter of the inner peripheral surface 5*d* of the heat blocking plate 5 may be first produced so as to be the maximum possible inner peripheral diameter which allows the variations in the diameter of the glass tube 1. Then, in accordance with the outer diameter of the glass tube 1 which is used in practice, a half-split surface (split surface 5*e*) may be cut so as to adjust the depth of the inner peripheral surface from the half-split surface. Additionally, several types of the heat blocking plate 5 may be prepared within the manufacturing error of the glass tube 1, and the heat blocking plate 5 may be used by being selected from the several types.

FIG. 2B illustrates an enlarged adjustment side cooling block 30-1, one of the two cooling blocks 30 illustrated in FIG. 1. The cooling block 30-1 is sealed with a hermetical seal 30*b*, and is attached to a spacer block 40-1. The attachment position of the hermetical seal 30*b* is adjusted by an adjustment plate 30*c*. A stationary side cooling block 30-2 sealed with the other hermetical seal 30*a* (refer to FIG. 1) does not have the adjustment plate 30*c*, and is fixed and assembled to a spacer block 40-2. When the adjustment side and the stationary side are not particularly distinguished from each other, all are simply referred to as the cooling block 30 and the spacer block 40. Additionally, similarly to the above-described O-ring 4, the hermetical seals 30*a* and 30*b* can be respectively made of an elastic material having heat resistance (for example, Viton (registered trademark) which is fluorine rubber).

Here, the glass tube 1 of the halogen heater 20 is molded by means of hot processing, and is made so that the flat portion 3*b* is sealed in a state where the inside of the glass tube 1 is filled with inert gas. Accordingly, the glass tube 1 cannot always be manufactured accurately as a straight tube. Therefore, it is desirable to dispose a structure for absorbing variations (manufacturing error) in the attachment position which result from bending of the glass tube 1. In the present embodiment, based on the attachment position of one stationary side cooling block 30-2, the attachment position of the other adjustment side cooling block 30-1 is adjusted. Therefore, the inner diameter of the through-hole 40*a* of the spacer block 40-1 to which the adjustment side cooling block 30-1 is attached is set to be larger than the outer diameter of the cooling block 30-1 to be assembled by an amount of the adjustment width. On the other hand, the attachment hole for attaching the cooling block 30-1 formed in the adjustment plate 30*c* does not include the adjustment width, and is formed to have a fittable size to substantially coincide with the outer diameter of the cooling block 30-1.

Here, the meaning of substantial coincidence is that both of these coincide with each other so as to be reasonably or snugly fitted well to each other. In other words, both of these coincide with each other to such an extent that both of these are reasonably fitted to each other using a sufficiently smaller clearance as compared to the adjustment width. Therefore, whereas, the adjustment plate 30*c* is fitted to the cooling block 30-1 without any substantial clearance, the cooling block 30-1 and the adjustment plate 30*c* which are fitted into each other can be moved relatively to the spacer block 40-1 for position adjustment and can be attached thereto. Then, the adjustment plate 30*c* is screwed and fastened to the spacer block 40-1 by using two bolts for positioning. Thereafter, the cooling block 30-1 may be firmly fastened to the spacer block 40-1 by further using four bolts so as to have air-tightness. The position adjustment can also be performed by suitably utilizing a fastening margin of the screw (bolt) fastening. In this manner, when an adjustment structure (adjustment plate 30*c*) for performing the position adjustment for the attachment position so as to align with the bending of the glass tube 1 is disposed, there is no possibility that an excessive force is applied to the glass tube 1 for the attachment. Therefore, the glass tube 1 can be prevented from being damaged or from losing air-tightness due to the excessive force applied to the seal.

In the present embodiment, furthermore, two back-up rings 4*c* are assembled on the inner side and the outer side in the axial direction between which the O-ring 4 is interposed in the axial direction of the halogen heater 20 so as to perform good airtight sealing by adjusting the external force applied to the O-ring 4 to be a uniform external force. Therefore, the two back-up rings 4*c* are disposed so as to adjust a deformation amount of the O-ring 4 to be a uniform deformation amount. In this manner, the O-ring 4 is interposed in the axial direction between the two back-up rings 4*c*. Accordingly, the O-ring 4 can improve the air-tightness of the seal between the glass tube 1 and the cooling block 30. The back-up rings 4*c* are disposed so as to be screwed and fastened to the cooling block 30 together with the heat blocking plates 5*a* and 5*b*. Accordingly, a force for interposing the O-ring 4 between the back-up rings 4*c* can be optionally adjusted by changing the thickness of the back-up rings 4*c*. Therefore, the air-tightness of the seal using the O-ring 4 can be optionally adjusted. Here, although the back-up rings 4*c* may employ a half-split ring similarly to the heat blocking plate, elastic single-split rings (C-rings with no clearance) may be used to expand in the axial direction. In this manner, the back-up rings 4*c* may be assembled to the glass tube 1.

FIG. 2C illustrates the halogen heater 20 serving as the heat radiation heater when viewed from the outside (outside of the chamber 10) in the axial direction of the halogen heater. The adjustment side cooling block 30-1 and the adjustment plate 30*c* which are described above are disposed so as to allow independent screw fastening and unfastening. Therefore, as described above, the adjustment plate 30*c* is first screwed and fastened to the spacer block 40-1, and then the cooling block 30-1 is screwed and fastened to the spacer block 40-1, thereby enabling the halogen heater 20 to be attached without applying the external force in the direction perpendicular to the axis of the halogen heater 20. Additionally, a pressing plate 30*d* is screwed and fastened to the cooling plate 30-1 from the outside in the axial direction of the halogen heater 20 so that the halogen heater 20 is not moved in the axial direction, thereby allowing the halogen heater 20 to be attached.

Figure 3A:
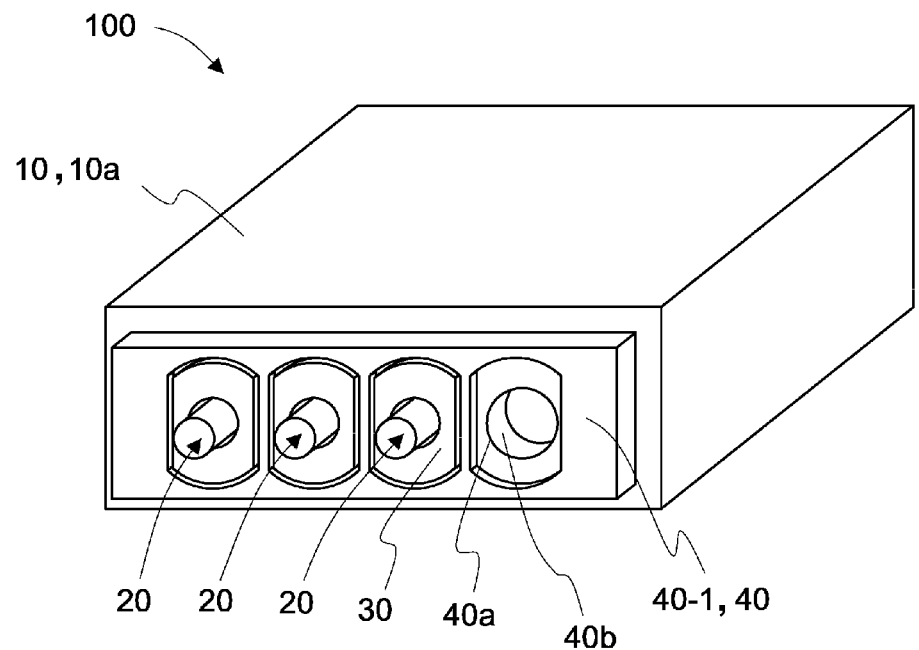
FIGS. 3A and 3B are perspective views illustrating an example of the thermal processing apparatus according to the first embodiment of the present invention.
Figure 3B:
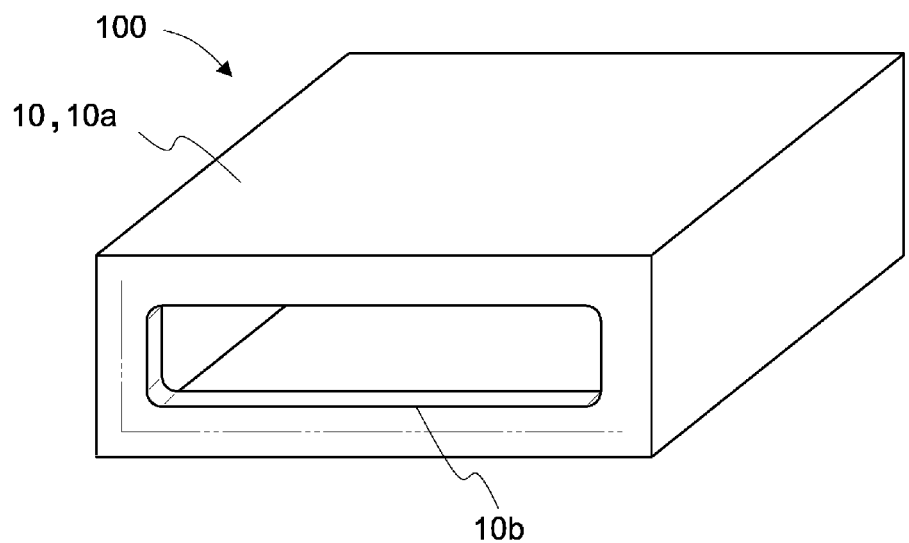

Referring to FIGS. 3A and 3B, the soldering apparatus 100 serving as the thermal processing apparatus according to the first embodiment of the present invention will be described. FIG. 3A illustrates an attachment structure of the halogen heater 20 serving as the heat radiation heater of the soldering apparatus 100 according to the present embodiment. As described above, the cooling block 30 is hermetically sealed with the hermetical seals 30a and 30b (refer to FIG. 1), and is fixed inside the through-hole 40a (refer to FIG. 2B) of the spacer block 40. Additionally, the spacer block 40 to which the cooling block 30 is attached is attached to the chamber 10 by causing the hermetical seal 40c (refer to FIG. 1) to hermetically close a through-opening 10b (refer to FIG. 3B) disposed on the partition wall 10a of the chamber. Similarly to the above-described O-ring 4, the hermetical seal 40c can be made of an elastic material having heat resistance (for example, Viton (registered trademark) which is fluorine rubber). In this case, when multiple types of the circuit board 200 (refer to FIG. 1) are present as a thermal processing object, multiple types of the spacer block 40 can be prepared and replaced with each other in accordance with the type of the circuit board 200. The halogen heater 20 is attached to the cooling block 30, and is further attached to the inside the through-hole 40a of the spacer block 40. Therefore, the halogen heater 20 can be arranged at any optional position by arranging the through-hole 40a at a position for most efficiently heating the circuit board 200.

In this case, as compared to a case where the halogen heater 20 is directly attached to the partition wall 10a of the chamber which has some difficulties in the replacement, the halogen heater 20 can be easily arranged at a most suitable heating position depending on the circuit board 200. Additionally, the arrangement of the halogen heater 20 can be changed within a short time in accordance with a change in the types of the circuit board 200 which is a thermal processing object to be thermally processed. Therefore, the soldering apparatus 100 can be a productive and excellent soldering apparatus which can efficiently solder various circuit boards 200. The partition wall 10a of the chamber and the spacer block 40 are made of stainless steel having relatively high insulating performance. In this case, not only the inside of the chamber 10 can be hermetically sealed, but also efficient soldering can be performed by insulating the inside from the outside of the chamber 10.

As described above, the soldering apparatus 100 according to the present embodiment has a decreased or small projection area in the direction perpendicular to the axis of the halogen heater 20. Here, the projection area in the direction perpendicular to the axis means a projection area when viewed from above in the drawing. That is, in a case of the configuration according to the present embodiment where the multiple halogen heaters 20 are arrayed side by side, the projection area means a projection area including the sealing structure of the halogen heater 20 when viewed in a direction vertical to a plane where the multiple halogen heaters 20 are arrayed side by side. Here, a halogen heater assembly is configured to include the O-ring 4 (refer to FIG. 1) and the heat blocking plate 5 (refer to FIG. 1). In addition, the halogen heater assembly has also a decreased or small projection area of the halogen heater assembly which includes the sealing structure when viewed from the front side in the drawing. Additionally, the O-ring 4 of the halogen heater 20 is disposed to be close to the tungsten coil 2 (refer to FIG. 1) inward in the axial direction of the halogen heater. Therefore, the soldering apparatus 100 is with a decreased or small internal volume of the chamber 10. The soldering apparatus 100 is a productive and excellent soldering apparatus which has high atmospheric adjustment efficiency. For example, comparing the time required to achieve vacuum by evacuating the atmosphere in the chamber 10 of the soldering apparatus 100 with that of the soldering apparatus in the related art, the present inventor has confirmed a very huge advantageous effect in that the time for the vacuum replacement can be reduced by 40%.

Even when the multiple halogen heaters 20 are disposed to be adjacent to each other, in the soldering apparatus 100 according to the present embodiment the multiple halogen heaters 20 can be closer to each other. Therefore, the circuit board 200 can be efficiently heated by using higher density of the heat radiation. Accordingly, since high heating efficiency is provided, the soldering apparatus 100 can be a productive and excellent soldering apparatus. Additionally, even when the multiple types of the circuit board 200 are soldered, the arrangement of the halogen heater 20 can be changed within a short time by replacing as required the spacer block 40 disposed depending on the circuit board 200. Therefore, the soldering apparatus 100 can be a productive and excellent soldering apparatus which can efficiently perform thermal processing on the various circuit boards 200.

Figure 4:
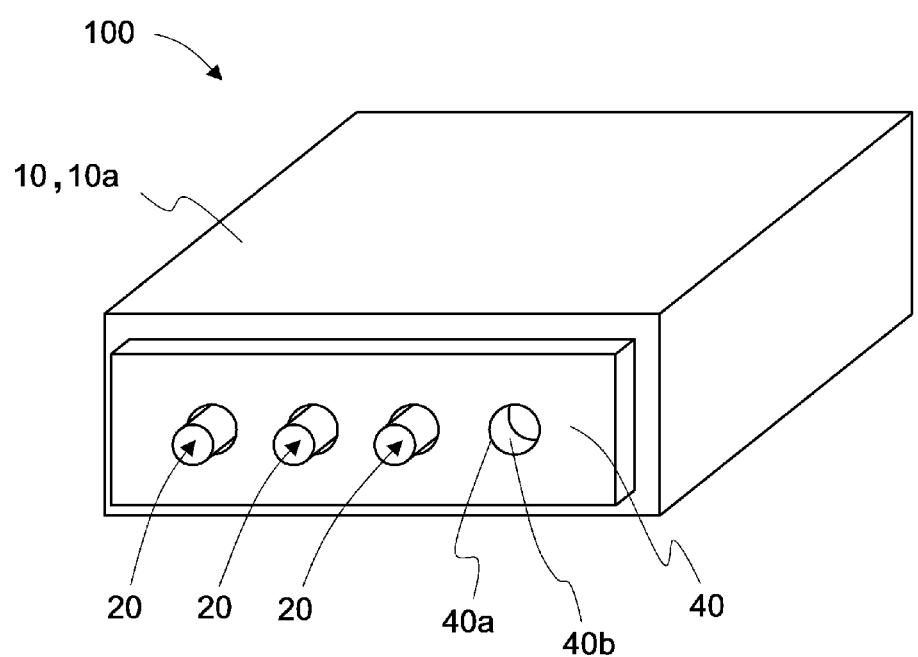
FIG. 4 is a perspective view illustrating an example of a thermal processing apparatus according to another embodiment of the present invention.

Referring to FIG. 4, the soldering apparatus 100 serving as a thermal processing apparatus according to another embodiment of the present invention will be described. In another embodiment, the cooling block 30 (refer to FIG. 3A) and the spacer block 40 which are described above may be disposed integrally. In this case, the above-described heat blocking plate 5 (refer to FIG. 1) can be directly fixed to the inside of the spacer block 40 (inside of the chamber 10) by means of screw fastening, and the O-ring 4 can be disposed so as to seal by directly bringing the outer peripheral surface 4b (refer to FIG. 2B) of the O-ring 4 (refer to FIG. 1) into contact with the through-hole 40a of the spacer block 40. This embodiment is easily applied to a case where the above-described flat portion 3b (refer to FIG. 2) is not formed in both end portions of the halogen heater 20. In this case, the soldering apparatus 100 can be more easily provided.

Figure 5:
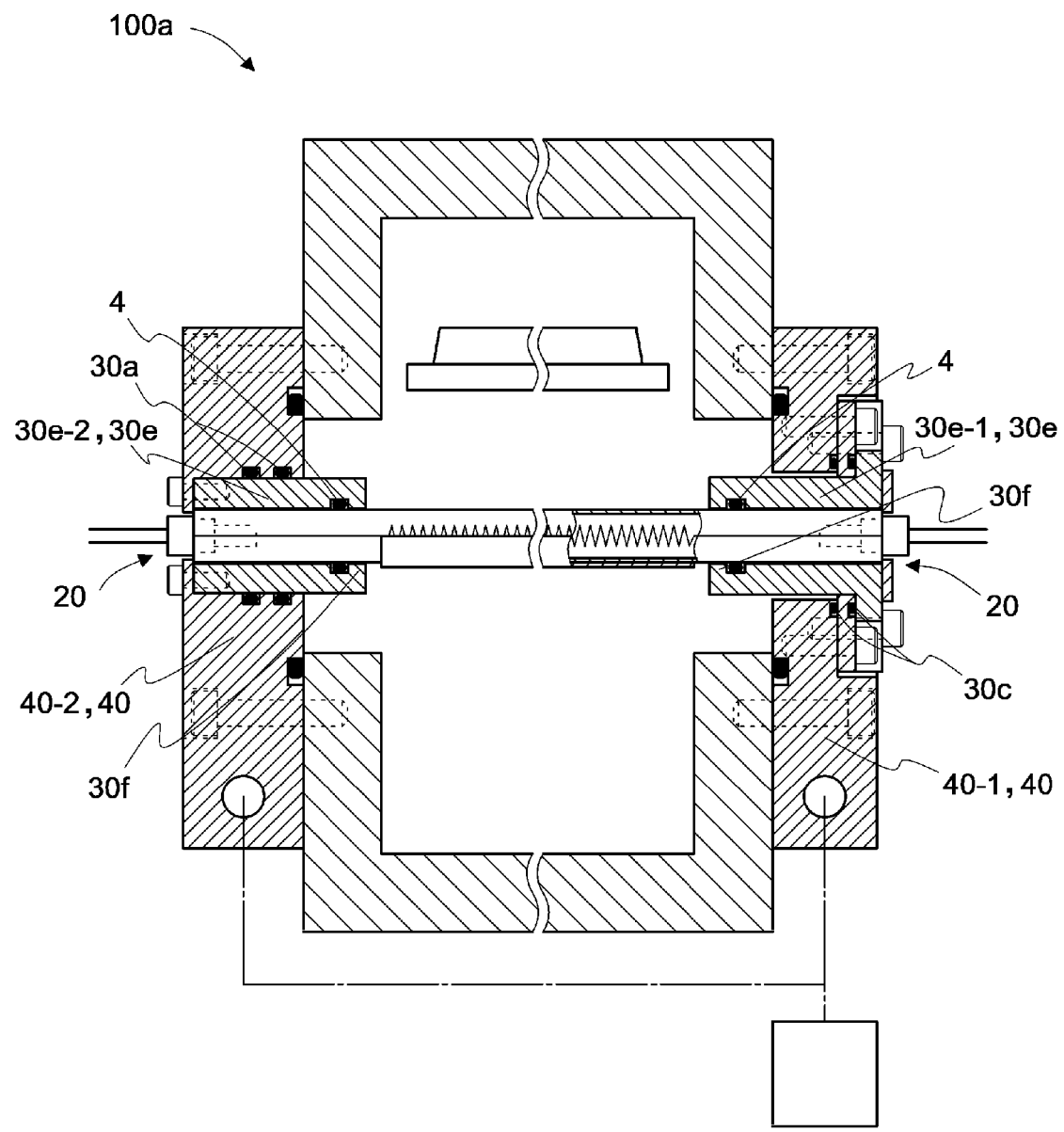
FIG. 5 is a front cross-sectional view illustrating an example of a thermal processing apparatus according to a second embodiment of the present invention. The drawing illustrates the thermal processing apparatus in the example and the workpiece, the intermediate sections in the longitudinal direction of which are cut away by two wavy lines so as to be partially omitted in the drawing. Additionally, the glass tube of the heat radiation heater and the white ceramic paint are illustrated by being partially cut away.

Referring to FIG. 5, a soldering apparatus 100a serving as a thermal processing apparatus according to a second embodiment of the present invention will be described. The soldering apparatus 100a is provided similarly to the soldering apparatus 100 according to the first embodiment of the present invention except that the heat blocking plate 5 (refer to FIG. 1) and the cooling block 30 (refer to FIG. 1) are integrated with each other so as to be disposed as a cooling block 30e. Accordingly, in the present embodiment, only the cooling block 30e will be described. In the cooling block 30e, an inner groove is formed in order to assemble the O-ring 4 to the inner surface of the through-hole surrounding the halogen heater 20. The O-ring 4 is assembled to the inner groove of the cooling block 30e and the heat is blocked by a heat blocking plate section 30f of the cooling block 30e facing in the axial direction of the halogen heater 20. Therefore, similarly to the case of the above-described heat blocking plate 5, the heat can be suitably blocked for the O-ring 4. On the other hand, as compared to a case where the heat blocking plate 5 and the cooling block 30 are independently disposed as described above, the integrally disposed cooling block 30e can efficiently transfer the heat, and can cool the heat blocking plate section 30f facing in the axial direction of the halogen heater. Therefore, in the soldering apparatus 100a according to the present embodiment, the O-ring 4 can be disposed at a further inner side position in the axial direction of the halogen heater 20 (position closer to the tungsten coil 2) as compared to the soldering apparatus 100 according to the above-described first embodiment.

Therefore, the soldering apparatus 100a according to the present embodiment can be provided with the further decreased internal volume of the chamber. In this manner, the soldering apparatus 100a can be an excellent soldering apparatus which has high atmospheric adjustment efficiency. This embodiment is also more easily applied to a case where the above-described flat portion 3b (refer to FIG. 2B) is not formed at both end portions of the halogen heater 20. Additionally, similarly to the cooling block 30-1 (refer to FIG. 1) of the soldering apparatus 100 (refer to FIG. 1) according to the first embodiment, the soldering apparatus 100a has an adjustment structure for adjusting an attachment position of a cooling block 30e-1. Therefore, an external force for attaching the halogen heater 20 can be prevented from being applied to the O-ring 4, thereby enabling the chamber 10 to be sealed in an improved airtight manner. Therefore, the soldering apparatus 100a can be provided as a revolutionary soldering apparatus which is reliable in production and is economically excellent in production in view of maintenance of the O-ring 4.

In the soldering apparatus according to the above-described embodiments, a case has been described where the soldering is performed by replacing the inside of the chamber 10 with the reducing gas atmosphere. However, in another embodiment, the soldering may be performed by simply exhausting the air from the inside of the chamber 10 by using a vacuum pump. In this case, the soldering can be more easily performed, preventing an oxide film from being formed on a soldering joint surface. Alternatively, in further another embodiment, the soldering may be performed, using formic acid gas as the reducing gas in place of hydrogen gas. In this case, the soldering can also be performed very reliably, similarly removing the oxide film formed on the soldering joint surface.

In the soldering apparatus according to the above-described embodiments, a case has been described where the halogen heaters 20 serving as the multiple heat radiation heaters are arranged side by side in parallel with each other on the same plane. However, in another embodiment, the soldering apparatus may include only one halogen heater 20. In this case, similarly, the soldering apparatus can also be disposed with the decreased internal volume of the chamber by downsizing the sealing structure for sealing the halogen heater. Accordingly, the excellent soldering apparatus can be realized which has high atmospheric adjustment efficiency. Additionally, in the soldering apparatus according to the above-described embodiments, a case has been described where the circuit board 200 is heated from below with the circuit board 200 arranged above the halogen heater 20. However, in another embodiment, the circuit board 200 may be directly heated from above using the halogen heater 20 with the circuit board 200 arranged below the halogen heater 20. In this case, the circuit board 200 can also be directly heated. Accordingly, the soldering apparatus can be realized which has excellent heating efficiency. Additionally, the support base in a case of supporting the circuit board 200 may be made of any optional material having heat resistance and heat conductivity, for example, such as stainless steel, copper (copper alloy), aluminum (aluminum alloy), and ceramics. The stainless steel is advantageously used in that the stainless steel is excellent in heat resistance and is less likely to be oxidized. The copper and the aluminum can efficiently heat the circuit board 200 since both of them have higher heat conductivity than the stainless steel. Furthermore, carbon steel may be used. When the support base is arranged below the halogen heater 20, it is not necessary to consider the heat conductivity. Accordingly, ceramics formed of quartz and the like having high heat resistance may be used.

Additionally, a case has been described where the heat radiation heater according to the above-described embodiments is the halogen heater 20. However, in another embodiment, the heat radiation heater may be a carbon heater 20 which is filled with carbon fiber filaments in inert gas. In this case, the carbon heater 20 can radiate more infrared rays in a wavelength range of approximately 2 µm to 4 µm close to a peak (wavelength of approximately 3 µm) of a water absorption spectrum. Typically, the circuit board 200 as the workpiece contains moisture a little (electronic components and boards of a semiconductor package generally have some moisture-absorption characteristics). Therefore, the carbon heater 20 as the heat radiation heater can efficiently heat the circuit board 200 through the moisture contained in the circuit board 200. Then, the moisture can be removed quickly. In further another embodiment, the heat radiation heater may be provided as a Nichrome wire heater in which air is filled and Nichrome filaments are placed. In this case, the heat radiation heater can be more easily provided.

Additionally, a case has been described where the outer surface of the half peripheral surface of the glass tube 1 (refer to FIG. 1) which surrounds the tungsten coil 2 (refer to FIG. 1) of the halogen heater 20 according to the above-described embodiments has the reflection surface 1a (refer to FIG. 1) which the white ceramic paint 1a applied to and reflects the heat radiation radiated in the opposite direction to the circuit board 200 (refer to FIG. 1), toward the circuit board 200. However, in further another embodiment, the reflection surface 1a disposed on the half peripheral surface of the glass tube 1 which surrounds the tungsten coil 2 may be formed by partially performing vacuum deposition (plating) on the glass tube 1 made of quartz glass by using other material such as chromium which has high reflectivity and heat resistance. Alternatively, in further another embodiment, instead of the chromium (plating), the reflection surface 1a may be formed of zirconium (plating) which similarly has high reflectivity and heat resistance.

Additionally, a case has been described where the O-ring 4 and the hermetical seals 30a, 30b, and 40c (refer to FIG. 1 for each) according to the above-described embodiments are made of fluorine rubber having heat resistance. However, in another embodiment, the O-ring 4 and the hermetical seals 30a, 30b, and 40c may be made of synthetic rubber (for example, silicone rubber) having desired air-tightness and heat resistance.

Additionally, a case has been described where the heat blocking plate 5 (refer to FIG. 1) and the cooling blocks 30 and 30e according to the above-described embodiments are made of stainless steel which is relatively good in insulation. However, when the cooling blocks 30 and 30e are sufficiently cooled (forcibly cooled), the heat blocking plate 5 and the cooling blocks 30 and 30e may be made of an aluminum alloy which has high heat conductivity. In this case, the heat blocking plate 5 and the cooling blocks 30 and 30e efficiently perform heat absorption and heat transfer. Accordingly, the heat can be blocked for the O-ring 4 (refer to FIG. 1). Additionally, a case has been described where the reflection surface 5c (refer to FIG. 2A) of the heat blocking plate 5 according to the above-described embodiments is subjected to nickel plating or chromium plating in order to improve reflectivity. However, in another embodiment, without the reflection surface 5c of the heat blocking plate 5 being subjected to metal plating, instead of the metal plating, the reflection surface 5c may be mirror finished through a polishing process. In this case, the reflection surface 5c can be provided more easily.

Additionally, a case has been described where the cooling medium circulation device 40e (refer to FIG. 1) according to the above-described embodiments circulates water serving as a cooling medium inside the cooling medium flow path 40d (refer to FIG. 1) disposed in the spacer block 40. However, in another embodiment, instead of the water, the cooling medium circulation device 40e may circulate air so as to cool the cooling block 30. In this case, the cooling medium circulation device 40e can be prevented from being stained and easily handled.

In the above-described embodiments, a case has been described where the thermal processing apparatus is the soldering apparatus. However, in the other embodiments, the thermal processing apparatus can be any optional thermal processing apparatus which perform thermal processing by heating a workpiece. For example, the thermal processing apparatus can be a thermal processing apparatus which performs thermal processing on a workpiece in a certain atmosphere inside a chamber for producing semiconductor integrated circuits and to form films by PVD or CVD.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 glass tube
1a white ceramic paint (reflection surface)
2 tungsten coil (heat radiation unit)
3 extension section
3a outer peripheral surface
3b flat portion
4 O-ring (ring seal)
4a inner peripheral surface
4b outer peripheral surface
4c back-up ring
5 heat blocking plate
5a first split component
5b second split component
5c reflection surface
5d inner peripheral surface
5e split surface
10 chamber
10a partition wall
10b through-opening
20 halogen heater (heat radiation heater)
30 cooling block
30-1 adjustment side cooling block
30-2 stationary side cooling block
30a hermetical seal
30b hermetical seal
30c adjustment plate
30d pressing plate
30e cooling block
30f heat blocking plate section
40 spacer block
40-1 adjustment side spacer block
40-2 stationary side spacer block
40a through-hole
40b inner peripheral surface
40c hermetical seal
40d cooling medium flow path
40e cooling medium circulation device
100 soldering apparatus (thermal processing apparatus)
100a soldering apparatus (thermal processing apparatus)
200 electronic component-mounted circuit board (workpiece)
300 heating apparatus
301 glass tube
301a infrared reflection film
304 sealing member
320 filament lamp
330 cooling air

The invention claimed is:
1. A thermal processing apparatus comprising:
a chamber for accommodating a workpiece of a thermal processing object, the chamber having a partition wall for partitioning an inside of the chamber from an outside of the chamber;
a heat radiation heater disposed penetrating the partition wall, wherein the heat radiation heater has a heat radiation unit for radiating heat to heat the workpiece, and a cylindrical glass tube covering the heat radiation unit and having an extension section extended outward beyond the heat radiation unit in an axial direction;

a ring seal arranged on an outer peripheral surface of the extension section, and hermetically sealing the inside of the chamber from the outside of the chamber, the ring seal having an inner peripheral surface coming into contact with the outer peripheral surface of the extension section; and a heat blocking plate spaced apart from the ring seal and arranged between the heat radiation unit and the ring seal in the axial direction of the glass tube, for blocking heat radiated from the heat radiation unit, the heat blocking plate having an inner peripheral surface fitting along the extension section, wherein the heat radiation unit is formed of a wire having a coil shape, and the wire has a linear shape disposed inside the extension section.

2. The thermal processing apparatus according to claim 1, further comprising:

a cooling block for holding the heat blocking plate, the cooling block covering the extension section and extending outward from the partition wall of the chamber in the axial direction of the glass tube, wherein the outer peripheral surface of the ring seal hermetically seals coming into contact with the cooling block.

3. The thermal processing apparatus according to claim 2, further comprising:

a cooling medium circulation device for cooling the cooling block.

4. The thermal processing apparatus according to claim 2, further comprising:

a spacer block having a through-hole penetrated therethrough by the cooling block, the spacer block being for positioning the heat radiation heater for the workpiece at a predetermined position, wherein the spacer block is attached hermetically covering a through-opening having a larger opening area than the through-hole and the through-opening is formed on the partition wall of the chamber, and wherein the cooling block and the spacer block are attached to each other being hermetically sealed.

5. The thermal processing apparatus according to claim 1, further comprising:

a spacer block having a through-hole for attaching the heat radiation heater, the spacer block being for positioning the heat radiation heater at a predetermined position relative to the workpiece, wherein the spacer block is attached hermetically covering a through-opening having a larger opening area than the through-hole and the through-opening is formed on the partition wall of the chamber, and wherein the outer peripheral surface of the ring seal hermetically seals coming into contact with the inner peripheral surface of the through-hole.

6. The thermal processing apparatus according claim 1, wherein the heat blocking plate is formed in a ring shape, and split into multiple components in such a way that the ring is split into multiple sections by a split surface or surfaces in a radial direction.

7. The thermal processing apparatus claim 2, wherein the heat blocking plate and the cooling block are formed as an integral component.

8. A thermal processing apparatus comprising:

a chamber for accommodating a workpiece of a thermal processing object, the chamber having a partition wall for partitioning an inside of the chamber from an outside of the chamber;

a heat radiation heater disposed penetrating the partition wall, wherein the heat radiation heater has a heat radiation unit for radiating heat to heat the workpiece, and a cylindrical glass tube covering the heat radiation unit and having an extension section extended outward beyond the heat radiation unit in an axial direction;

a ring seal arranged on an outer peripheral surface of the extension section, and hermetically sealing the inside of the chamber from the outside of the chamber, the ring seal having an inner peripheral surface coming into contact with the outer peripheral surface of the extension section;

a heat blocking plate arranged between the heat radiation unit and the ring seal in the axial direction of the glass tube, for blocking heat radiated from the heat radiation unit, the heat blocking plate having an inner peripheral surface fitting along the extension section; and a cooling block for holding the heat blocking plate, the cooling block covering the extension section and extending outward from the partition wall of the chamber in the axial direction of the glass tube, wherein the outer peripheral surface of the ring seal hermetically seals coming into contact with the cooling block; and the thermal processing apparatus further comprising a spacer block having a through-hole penetrated therethrough by the cooling block, the spacer block being for positioning the heat radiation heater for the workpiece at a predetermined position, wherein the spacer block is attached hermetically covering a through-opening having a larger opening area than the through-hole and the through-opening is formed on the partition wall of the chamber, and wherein the cooling block and the spacer block are attached to each other being hermetically sealed.

9. A thermal processing apparatus comprising:

a chamber for accommodating a workpiece of a thermal processing object, the chamber having a partition wall for partitioning an inside of the chamber from an outside of the chamber;

a heat radiation heater disposed penetrating the partition wall, wherein the heat radiation heater has a heat radiation unit for radiating heat to heat the workpiece, and a cylindrical glass tube covering the heat radiation unit and having an extension section extended outward beyond the heat radiation unit in an axial direction;

a ring seal arranged on an outer peripheral surface of the extension section, and hermetically sealing the inside of the chamber from the outside of the chamber, the ring seal having an inner peripheral surface coming into contact with the outer peripheral surface of the extension section;

a heat blocking plate arranged between the heat radiation unit and the ring seal in the axial direction of the glass tube, for blocking heat radiated from the heat radiation unit, the heat blocking plate having an inner peripheral surface fitting along the extension section; and a spacer block having a through-hole for attaching the heat radiation heater, the spacer block being for positioning the heat radiation heater at a predetermined position relative to the workpiece, wherein the spacer block is attached hermetically covering a through-opening having a larger opening area than the through-hole and the through-opening is formed on the partition wall of the chamber, and wherein the outer peripheral surface of the ring seal hermetically seals coming into contact with the inner peripheral surface of the through-hole.

* * * * *